United States Patent
Sato et al.

[11] Patent Number: 6,034,351
[45] Date of Patent: Mar. 7, 2000

[54] CLEANING APPARATUS FOR WELDING TORCH NOZZLE AND METHOD OF CLEANING THE SAME

[76] Inventors: Katsuhiro Sato, 3, 007, Nishifuji-cho, Onomichi-shi, Hiroshima, 729-0142, Japan; Hiroyuki Izumi, 5, 434, Takasu-cho, Onomichi-shi, Hiroshima, 729-0141, Japan; Motoaki Maruyama, 4, 993, Takasu-cho, Onomichi-shi, Hiroshima, 729-0141, Japan; Toshiya Hayashida, 85-1, Kubo-cho, Onomichi-shi, Hiroshima, 722-0042, Japan; Yusuke Harayama, 11, 700-3, Kurihara-cho, Onomichi-shi, Hiroshima, 722-0022, Japan; Kenji Yoshida, 2-47-4, Kameino, Fujisawa-shi, Kanagawa, 252-0813, Japan; Kenji Hiroi, 366-7, Shiromeguri, Kamakura-shi, Kanagawa, 247-0074, Japan

[21] Appl. No.: 09/103,806

[22] Filed: Jun. 24, 1998

[51] Int. Cl.[7] .................................................. B23K 9/32
[52] U.S. Cl. ........................................ 219/136; 219/137.2
[58] Field of Search ................................ 219/136, 137.2, 219/74

[56] References Cited

FOREIGN PATENT DOCUMENTS 62-114776 of 0000 Japan .................................. 219/136
5-269668 10/1993 Japan .

*Primary Examiner*—Clifford C. Shaw
*Attorney, Agent, or Firm*—Jones, Tullar & Cooper, PC

[57] ABSTRACT

A cleaning arrangement for removing sputter attached to a welding torch nozzle includes a cylindrical container with screen at the lower end thereof, shot material held by the screen, an air injection nozzle disposed above the screen, a suction tube under the nozzle and a torch nozzle sensor to control the sputter removal process.

5 Claims, 4 Drawing Sheets

CLEANING APPARATUS FOR WELDING TORCH NOZZLE AND METHOD OF CLEANING THE SAME

BACKGROUND OF THE INVENTION

1. Field of the Invention

The present invention relates to an improvement of a cleaning apparatus for removing a sputter attached to a welding torch nozzle (hereinafter, referred to as a torch nozzle) used in an arc welder using a shield gas.

2. Related Art

The cleaning apparatus for the torch nozzle mentioned above includes the apparatus which was filed as Japanese Patent Application No. 4-329979 by the applicant of this application and laid-open as Japanese Patent Unexamined Publication No. 5-269668, and the like. The cleaning apparatus is structured such that, as shown by reference numeral 1 in FIG. 6, an air nozzle body 4 forming an air suction hole 4a through a wire netting portion 3 is stood up near a bottom portion 2a disposed below a cylindrical container main body 2. An air chamber 5 is provided in the air nozzle body 4 in such a manner as to surround the air suction hole 4c in body 4. The air chamber 5 is connected to a compressed air source 7 through a solenoid valve 6 by means of a tube 8. An insertion port 9a of a torch nozzle T is provided in a cover 9 covering an upper end of the container main body 2. A discharge port 1a is formed in the main body in a freely opening and closing manner in such a manner as oppose to the air nozzle body 4, and a shield ring 10 is fixed to the lower end of the insertion part 9a.

The apparatus may be structured such that, as shown in an imaginary line in FIG. 6, a sensing switch 11 for sensing an insertion from the insertion port 9a of the torch nozzle T, is horizontally mounted to a portion near the upper end of the container main body 2 so that a front end of a contact element 11a projects into an insertion area of the torch nozzle T. The sensing switch 11 is electrically connected between a source 12a in the robot control apparatus 12 and the solenoid valve 6. This has been filed as Japanese Patent Application No. 6-129496. In this case, in FIG. 6, reference numeral 1a denotes a discharge outlet having a metal netting S attached, and reference numerals 13 and 14, respectively, denote a relief valve and a valve with a cock disposed between the solenoid valve 6 and the compressed air source 7.

Further, in the cleaning apparatus for the torch nozzle as mentioned above, for example, when the sputter becomes attached to the portion near the front end of the torch nozzle T, which is attached to the front end of a robot arm, as by performing a welding, the torch nozzle T is inserted through the insertion port 9a of the cleaning apparatus 1 by the robot control apparatus 12 which includes a power source 12a, so as to extend through the shield ring 10. The sensing switch 11 senses this and connects the solenoid valve 6 to the power source through the robot control apparatus 12. The valve is opened to an ON state, and the compressed air is communicated with the air chamber 5 by the tube 8. Accordingly, the compressed air is blown into the air nozzle body 4 from the air blowing hole 4c and is strongly injected out above the upper end of the air nozzle body 4. As a result, shot material 15 (such as a rigid ball, a broken piece of sputter, or the like), which is located in the bottom portion of the container main body 2, is sucked up by the lower end of the air nozzle body 4 and is carried by the compressed air flow from the upper end of the air nozzle body 4 and collides with the sputter attached to the portion near the front end of the torch nozzle T.

Therefore, the sputter is separated from the torch nozzle T as a ring or a broken piece so as to be dropped, and after a predetermined time has elapsed, the cleaning of the torch nozzle T is completed.

In the foregoing cleaning apparatus 1, the following problems are present.

a. Since the bottom portion 2a, which is removably mounted to the lower portion of the container main body 2, is formed in a cylindrical shape, the shot material 15 and the broken piece of the sputter dropped through the metal netting 3 are not collected in the lower portion of the air nozzle body 4, so that there is a problem in that the suction applied to the shot material 15 or the like by means of the air nozzle body 4 is deteriorated.

b. The cover 9 is formed in a cylindrical shape and covers the upper end of the container main body 2 with a gap in the periphery. However, there is an inconvenience in attaching the sensing switch 11 or the like, and there is a problem that the switch or the like can not be protected from the collision with the torch nozzle or the like, for example, due to an unexpected motion of the robot.

c. Since the seal ring 10 is fixed to the inner peripheral lower end of the torch nozzle insertion hole 9a formed in the middle of the cover 9 by means of a member substantially independent from the cover 9, there is a problem in the time required for attaching it.

d. The discharge port 1a is provided near the upper end of the container main body 2 and the metal netting S is attached to the inside portion thereof; however, there is a problem in that the metal netting S can not be replaced even when it is soiled or is plugged.

e. Since the sensing switch 11 only has a rod-like contact element 11a, there is a problem in that it is hard to detect the insertion of the torch nozzle T from the insertion hole 9a.

SUMMARY OF THE INVENTION

The present invention was made in order to solve the problems mentioned above, and has as a first object providing a cleaning apparatus for a welding torch nozzle which is more practical and novel.

A second object is providing a cleaning apparatus for a welding torch nozzle with a seal ring structure which has a highly resistant performance against the heat of the torch nozzle and against collision with the shot material.

A third object of the invention is providing a control apparatus for a cleaning apparatus for a welding torch nozzle which directly senses an insertion of the torch nozzle into the cleaning apparatus, and effectively, securely and safely performs an operation of the cleaning apparatus.

A fourth object of the invention is providing a method of cleaning a welding torch nozzle which prevents sputter fine powder from plugging the torch nozzle.

In order to achieve the objects mentioned above, in accordance with the invention, there is provided a cleaning apparatus for a welding torch nozzle comprising a cylindrical container, a screen member removably disposed at a lower end of the container and having a funnel-shaped member in an inner periphery thereof, and an air nozzle mechanism having an injection nozzle disposed above the screen member within the container. The injection port is inclined upwardly in a middle portion, of the nozzle. An air introduction chamber surrounds the nozzle and is connected to an air pressure introduction tube disposed in an outer portion. A cover plate is disposed in an outer periphery of an upper end of the container so as to protect and mount an attachment apparatus, and has an air guide for covering an air discharge port provided near the upper end. A removable filter is inserted from the upper end of the container and covers the air discharge port from an inside thereof. A top plate covers the upper end opening portion of the container, the plate having a torch nozzle insertion hole in the center thereof in such a manner as to be coaxial with the injection tube. A recess portion for receiving a seal mechanism in correspondence to the torch nozzle is secured in an inner periphery of the insertion hole, and fixed to the cover plate by a screw, and a seal mechanism is disposed in the recess portion. A nozzle sensing portion has a front end formed in a fork shape, and a switch main body supports the sensing portion and is operated thereby. The main body extends through the container and the cover plate, and the sensing portion front end comprises a torch nozzle sensing mechanism fixed in such a manner as to be positioned immediately below the torch nozzle insertion hole. Suitable shot material, such as a small rigid ball, is provided on the screen.

Further, in accordance with the invention, there is provided a cleaning apparatus for a welding torch nozzle, wherein the seal mechanism is constituted by a coil spring-like seal ring.

Still further, in accordance with the invention, there is provided a cleaning apparatus for a welding torch nozzle, wherein the torch nozzle is provided with a shield gas passage, a compressed air introduction tube having a compressed air source is connected to the passage through a first solenoid valve, a second solenoid valve is interposed in the compressed air introduction tube having the compressed air source, the torch nozzle sensing mechanism is electrically connected to the second solenoid valve in series, and the first solenoid valve, the connected second solenoid valve and the torch nozzle sensing mechanism are connected to the control apparatus.

Moreover, in accordance with the invention, there is provided a method of cleaning a welding torch nozzle, wherein at a time of starting a cleaning operation of the torch nozzle, at first the first solenoid valve is opened, and next the second solenoid valve is opened, and at a time of finishing the cleaning operation, the second solenoid valve is first closed and thereafter the first solenoid valve is closed.

DESCRIPTION OF THE PREFERRED EMBODIMENT

Figure 1:
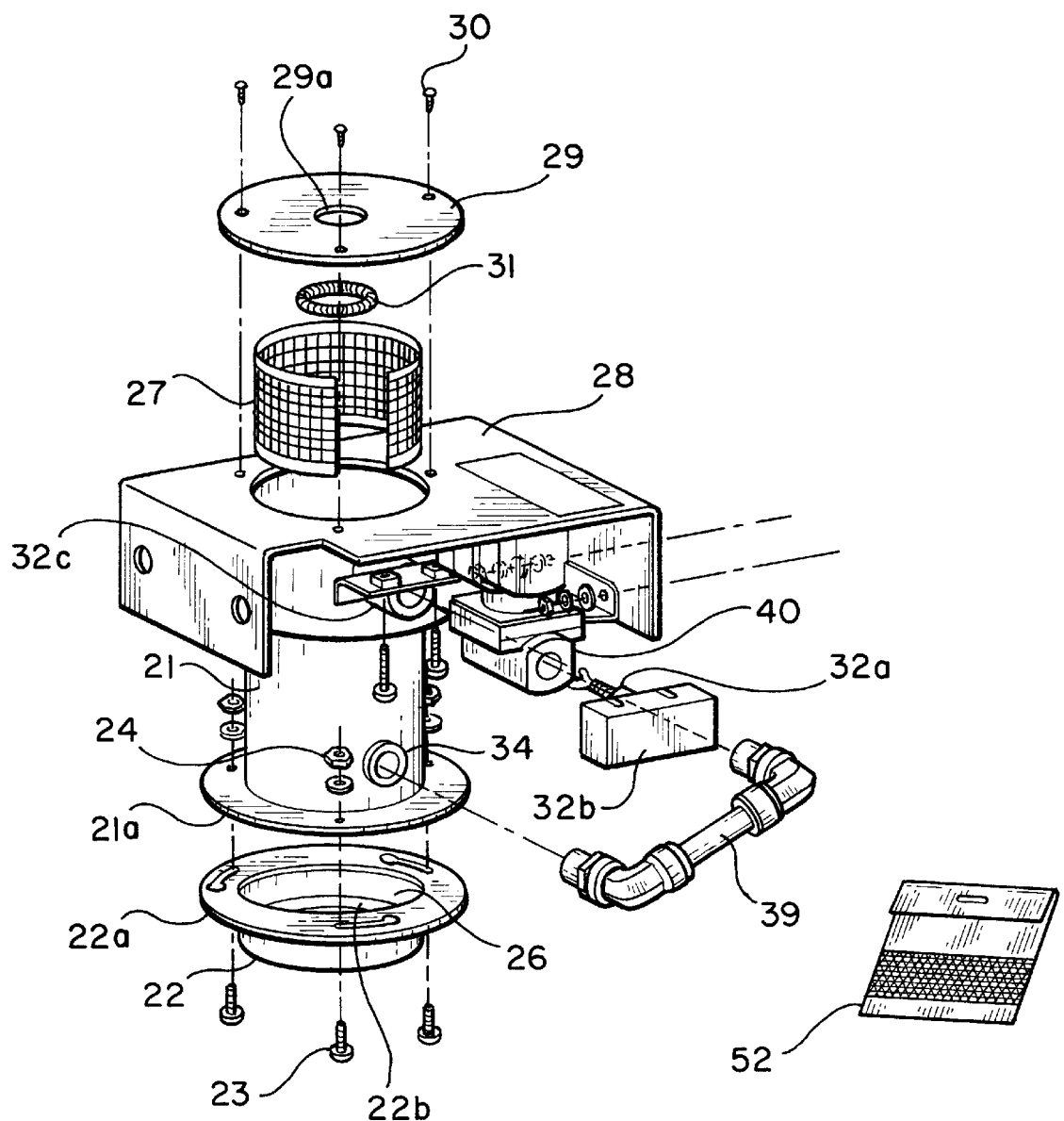
FIG. 1 is an exploded view which shows a cleaning apparatus for a welding torch nozzle in accordance with the present invention.
Figure 2:
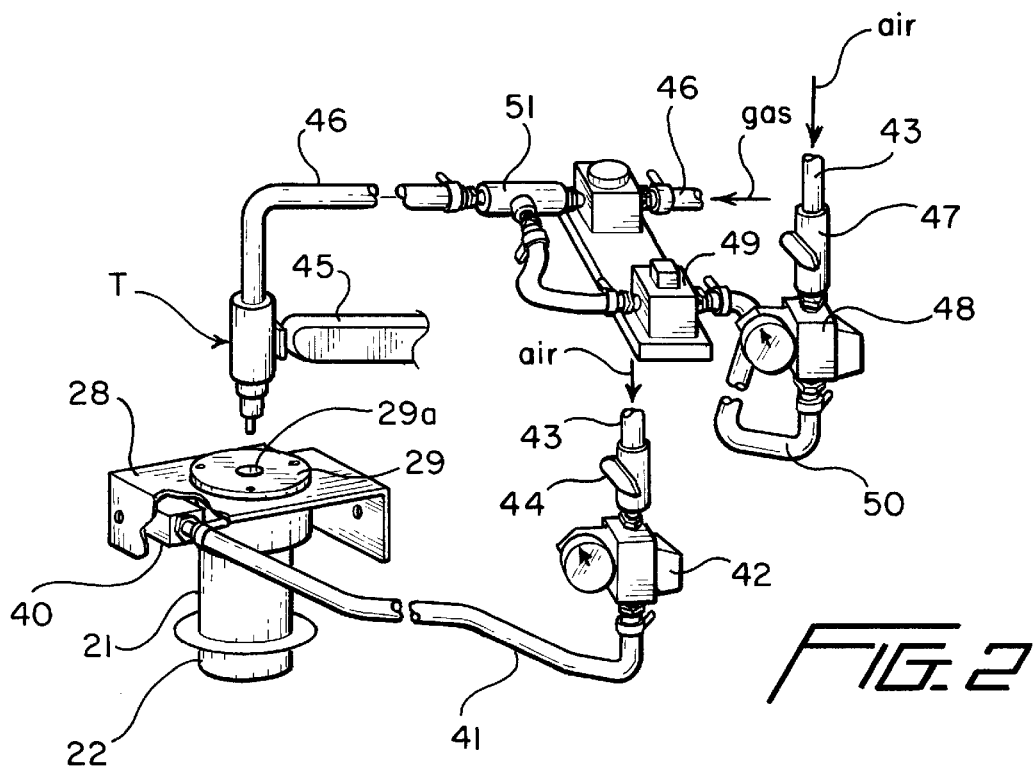
FIG. 2 is a schematic view which shows piping for a cleaning apparatus for a welding torch nozzle in accordance with the present invention.

An embodiment in accordance with a first aspect of the present invention will be described in detail below with reference to FIGS. 1 to 4. Reference numeral 21 denotes a cylindrical container which has a screen 22 for separation disposed at a lower end thereof and having the same diameter as that of the cylindrical container. The container 21 and the screen 22 are structured such as to be integrally combined with each other by aligning a container end flange 21a formed near the lower end portion of container 21 with a flange 22a formed on an upper end of the screen 22 with the screen 22 forming an opposing end portion, extending bolts 23 through both of the flanges 21a and 22a and screwing nuts 24 onto the corresponding bolts 23.

A metal netting 25 is adhered to a small flange portion 22b near the lower end of the screen 22, and, a funnel-like member 26 is adhered to an inner periphery of the screen 22. In this case, the metal netting 25 has a size sufficient to prevent shot material such as small rigid balls from dropping through the screen.

A plurality of air discharge ports 21b are circumferentially provided in a wall near the upper end of the container 21, and a filter holding portion 21c is formed to hold a cylindrical filter 27 at a position below the upper end of the container 21 and inside the cylindrical container 21 in such a manner as to position the filter to cover the discharge port 21b. The cylindrical filter 27 is inserted into the container 21 from the upper end of the container.

A cover plate 28 with an air guide 28a for protecting and mounting a second solenoid valve 40, to be described below is provided on an outer periphery of an upper end of the cylindrical container 21. The air guide 28a extends downwardly over the air discharge port 21b. The air guide 28a extends downwardly over the air discharge port 21b. The cover plate 28 is formed, for example, in a rectangular shape as shown in FIG. 1, and this longitudinally extends in a direction perpendicular to the surface of the page in FIG. 4.

Reference numeral 29 denotes a top plate, which is mounted to the cover plate 28 by small screws 30 in such a manner as to plug the upper end opening portion of the cylindrical container 21. A torch nozzle insertion hole 29a is formed in a center of the top plate 29, a seal ring holding portion 29b is formed in an inner peripheral end of the torch nozzle insertion hole 29a, and a coil spring type seal ring 31 is secured in the holding portion 29b. In this case, the top plate 29 is fixed in such a manner that an axial center of the torch nozzle insertion hole 29a is coaxial with that of an injection nozzle 36 of an air nozzle mechanism 33 to be described below. Further, since the seal ring 31 is required to be made thick (narrow) when the diameter of the torch nozzle T becomes narrow (thick), the seal ring holding portion 29b is structured to have room in such a manner as to correspond to this.

Figure 3A:
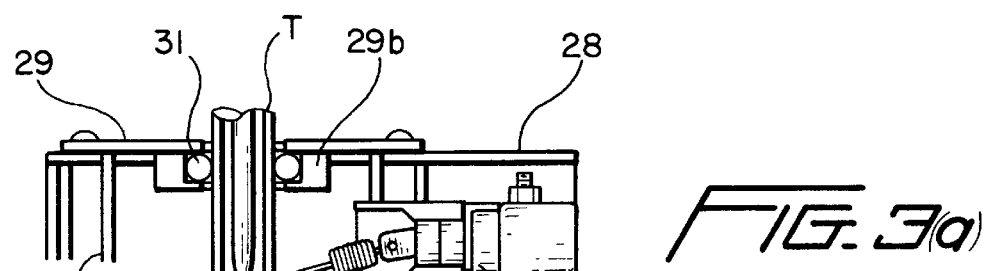
FIG. 3A is a side elevational view which shows a torch nozzle sensing mechanism in a cleaning apparatus for a welding torch nozzle in accordance with the present invention, together with the torch nozzle.
Figure 3B:
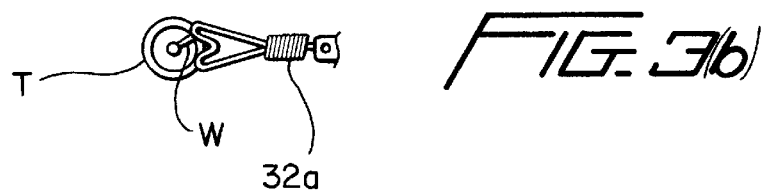
FIG. 3B is a plan view which shows a torch nozzle sensing mechanism in a cleaning apparatus for a welding torch nozzle in accordance with the present invention, together with the torch nozzle.

Reference numeral 32 denotes a torch nozzle sensing mechanism, which, as shown in FIG. 3 in detail, is constituted by a nozzle sensing portion 32a having a fork-like front end and a switch main body 32b supporting the sensing portion 32a and operated thereby. The main body 32b is inserted into a holding portion 32c fixed to the container 21 and the cover plate 28 so as to be held, and the front end of the sensing portion 32a is positioned immediately below the torch nozzle insertion hole 29a.

Figure 4:
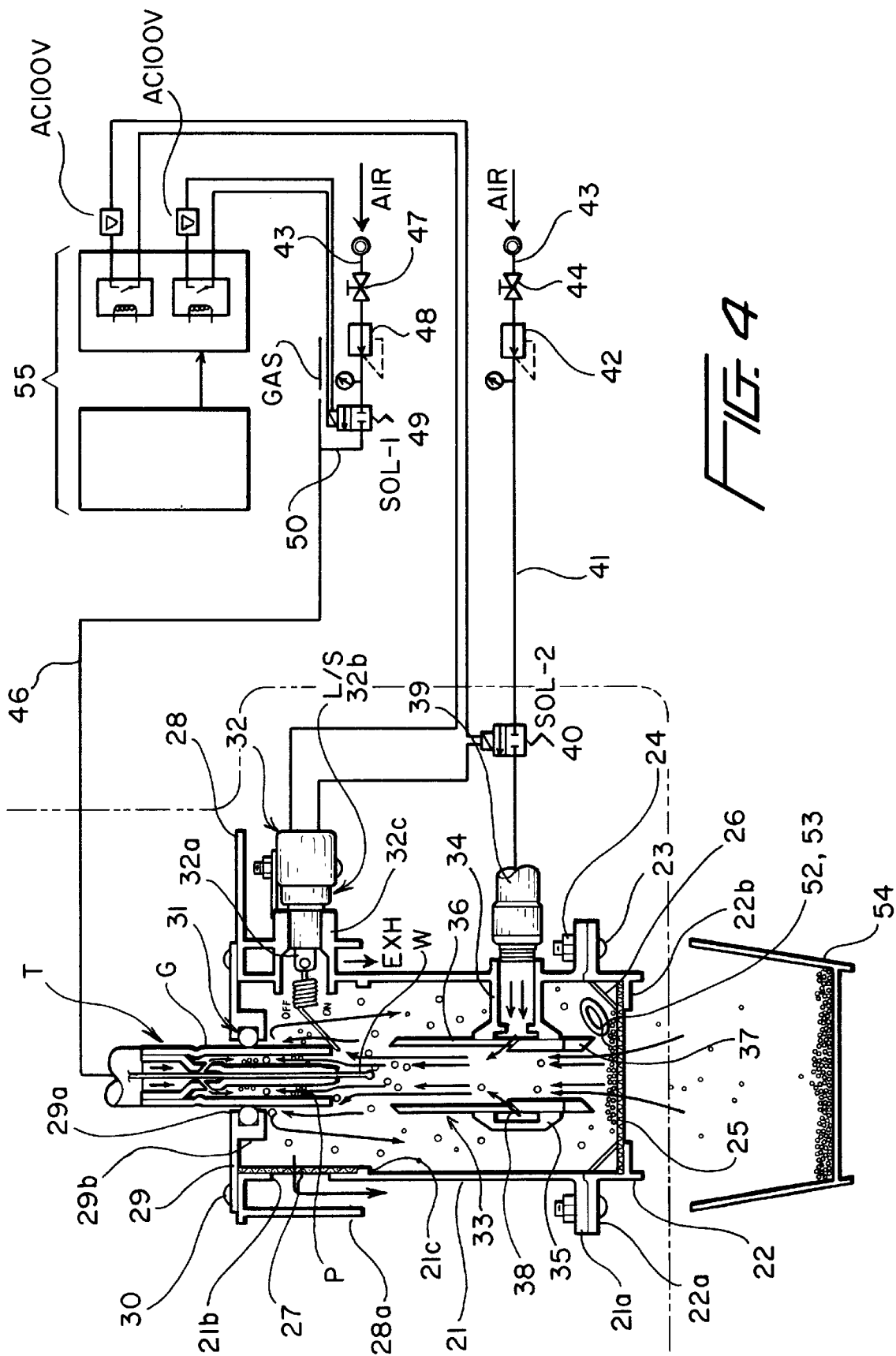
FIG. 4 is a cross sectional view which shows a cleaning apparatus for a welding torch nozzle in accordance with the present invention during operation, together with a control apparatus thereof.

Reference numeral 33 denotes an air nozzle mechanism, which is mounted in the interior of the cylindrical container 21 through a connecting tube 34. The nozzle mechanism is constituted by an air introduction chamber 35 having a center disposed in a center of the container 21, with an injection nozzle 36 mounted to the center of the air introduction chamber 35 from the upper portion, and a suction tube 37 threadedly fastened to a lower portion of the air introduction chamber 35 in such a manner that the front end of tube 37 is fitted into the injection nozzle 36, and forms an inclined gap (an air blowing hole) 38, directing air into an upper portion of the center of the injection nozzle 36 through an abutment between the injection nozzle 36 and the suction tube 37. The gap 38 is adjusted to be an appropriate inclined gap by forward and backward movement the suction tube 37 by screwing into or out of the air introduction chamber 35. In this case, as shown in FIG. 4, the injection nozzle 36 and the suction tube 37 are structured such as to make the inner diameter thereof larger than the outer diameter of the torch nozzle T, so that the sputter ring dropped from the front end of the nozzle T can easily pass therethrough.

The air nozzle mechanism 33 having the structure mentioned above is supported by the air introduction chamber 35 to form an appropriate space below the suction tube 36 and near the screen 22 by projecting the connecting tube 34 from the side surface of the container main body 1 as mentioned above.

Piping air to the air nozzle mechanism 33 is performed as follows. One end of a rigid tube 39 is connected to the connecting tube 34, and the other end is connected to the second solenoid valve 40 mounted to the lower surface of the cover plate 28. Valve 40 is connected through a soft tube 41 and a relief valve 42 to a valve 44 with a cock disposed in an air main tube 43 (pressure; 4 to 5 kg/cm$^2$) supplying compressed air or the like. In this case, FIGS. 2 and 4 also show a piping 46 leading to the welding torch nozzle T. The piping 46 carries a normal shield gas (a carbonic acid gas or the like) from the valve 46a with a cock (FIG. 2) and carries air from the main tube 43 through a relief valve 48 and the first solenoid valve 49 by means of a soft tube 50 and a three way joint 51.

Reference numeral 52 denotes shot material, which is mainly constituted by stainless balls 53 having a diameter of about 1 to 2 mm, and by adding the broken and dropped sputter pieces. An appropriate number of stainless balls 53 are inserted on the metal netting 25 of the screen 22 before using the apparatus.

In the cleaning apparatus for the torch nozzle in accordance with the present invention structured in the above manner, the cleaning apparatus is mounted to, for example, a suitable table (not shown). Adjacent the table is a robot 45 which supports the nozzle T and, when the nozzle is to be cleaned, the robot it through the insertion hole 29a in the cover plate 28. A sputter dust receiver 54 is placed under the screen 22 of the container 21, as shown in FIG. 4. When the torch nozzle T to which the sputter is attached is inserted into the torch nozzle insertion hole 29a of the cylindrical container 21 of the present invention it passes through hole in the seal ring 31 and is held in coaxial alignment with nozzle 36.

When the torch nozzle T passes through ring 31, it is brought into contact with the fork-like nozzle sensing portion 32a of the sensing mechanism 32, thereby turning the switch main body 32b to an ON state. This opens the second solenoid valve 40, so that compressed air is supplied to the air introduction chamber 35 of the air nozzle mechanism 33 through the previously opened valve 44 with the cock and relief valve 42 by means of the soft tube 41, the rigid tube 39 and the connecting tube 34.

Therefore, since the compressed air within the air introduction chamber 35 is injected from the injection nozzle 36 through the gap 38, the inner portion of the suction tube 37 becomes negative pressure, so that at first only the small stainless balls 53 are sucked, radiated over the injected air flow from the injection nozzle 36, carried into the gas nozzle G of the torch nozzle T mounted on the same axis as that of the injection nozzle 36, and collided with the inner and outer surfaces thereof and the front end portion of the welding wire W.

Accordingly, the sputter P attached to the inner and outer surfaces of the torch nozzle and the other components of the nozzle and the oxide film in the front end portion of the welding wire W can be removed.

Particularly, the shot material 52 which enters into the gas nozzle G in the torch nozzle T is carried upwardly and collides with the inner surface, thereby efficiently removing the sputter P in the inner end of the gas nozzle. The injected air is discharged out of the container 21 from the air discharge port 21b through the filter 27. At the same time, small pieces of the broken sputter will scatter out of the container main body through filter 27 however, the small pieces which pass through the filter are introduced downward along the outer end of the container 21 by the air guide 28a of the cover plate 28 and mainly enter into the sputter dust receiver 54.

The small rigid balls which collide with the inner and outer surfaces of the torch nozzle and the welding wire front end portion, and the relatively large pieces of sputter left within the container among the shot material are again radiated toward the torch nozzle T and the like by the air nozzle mechanism 33, and the broken and finely divided sputter dust drops down from the meshes of the metal netting 25 in the screen 22 so as to be stored in the sputter dust receiver 54.

In accordance with the present invention, the coil spring type seal ring 31 is formed from a steel coil having a wire diameter of 0.3 to 0.8 mm and a coil diameter of about 6 to 10 mm. The coil spring has an inner diameter of about 15 to 30 mm in correspondence to the diameter of the torch nozzle T and to overlap the end portions 20a.

The seal ring 31 structured in the above manner is held within the seal ring holding portion 29b.

Accordingly, in the cleaning apparatus for the torch nozzle with the seal ring 31 in accordance with the present invention, when the torch nozzle, to which the sputter is attached as a result of a welding operation, is inserted into insertion port 29a and through the seal ring 31. The inner diameter of the coil spring type seal ring 31 is expanded so as to be brought into contact with the periphery of the torch nozzle T. The coil 31 deflects the shot material 52 flying toward the insertion port 29a at a high speed together with the compressed air during cleaning of the torch nozzle T and prevents the shot material 52 from scattering outward.

As mentioned above, a shield gas passage, which is connected to piping 46, is provided in the torch nozzle T. A compressed air introduction tube 50 having a compressed air source is connected to this passage through a first solenoid valve 49. The second solenoid valve 40 is interposed in the compressed air introduction tube 41 leading from the compressed air source and connected to the air nozzle mechanism 33. The torch nozzle sensing mechanism 32 is electrically connected to the second solenoid valve 40 in series.

The first solenoid valve 49, the second solenoid valve 40 and the torch nozzle sensing mechanism 32 are connected to a control apparatus 55 for the robot 45 and the like.

Accordingly, when sputter has become attached to the portion near the front end of the torch nozzle T due to a welding operation, the torch nozzle T is inserted through the insertion port 29a while injecting compressed air from the front end thereof, and is extended through the shield ring 31, so that the sensing mechanism 32 is turned to an ON state. This turns the second solenoid valve 40 to an ON state and to open, thereby automatically communicating the compressed air with the air introduction chamber 35 of the air nozzle mechanism 33.

Therefore, as mentioned above, the compressed air is strongly injected upward from the injection nozzle 36 and the suction tube 37 sucks the shot material 52 (the small rigid ball, the broken pieces of the sputter and the like) so as to ride over the compressed air flow, thereby colliding with the sputter attached to the portion near the front end of the torch nozzle T from the upper end of the injection nozzle 36, and the sputter is parted from the torch nozzle T as a ring or as broken pieces so as to be dropped. The cleaning of the torch nozzle T is completed after a predetermined time has elapsed, and the sensing mechanism 32 is then turned to an OFF state. The second solenoid valve 40 is turned to an OFF state by drawing out the torch T from the insertion hole 29a, so that the injection of the compressed air from the injection nozzle 36 is automatically stopped.

Figure 5:
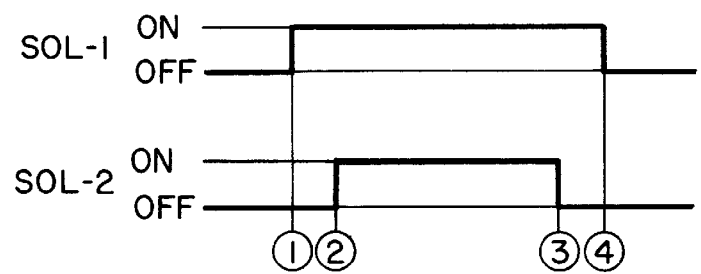
FIG. 5 is a view which shows an operation timing of a cleaning apparatus for a welding torch nozzle in accordance with the present invention.
Figure 6:
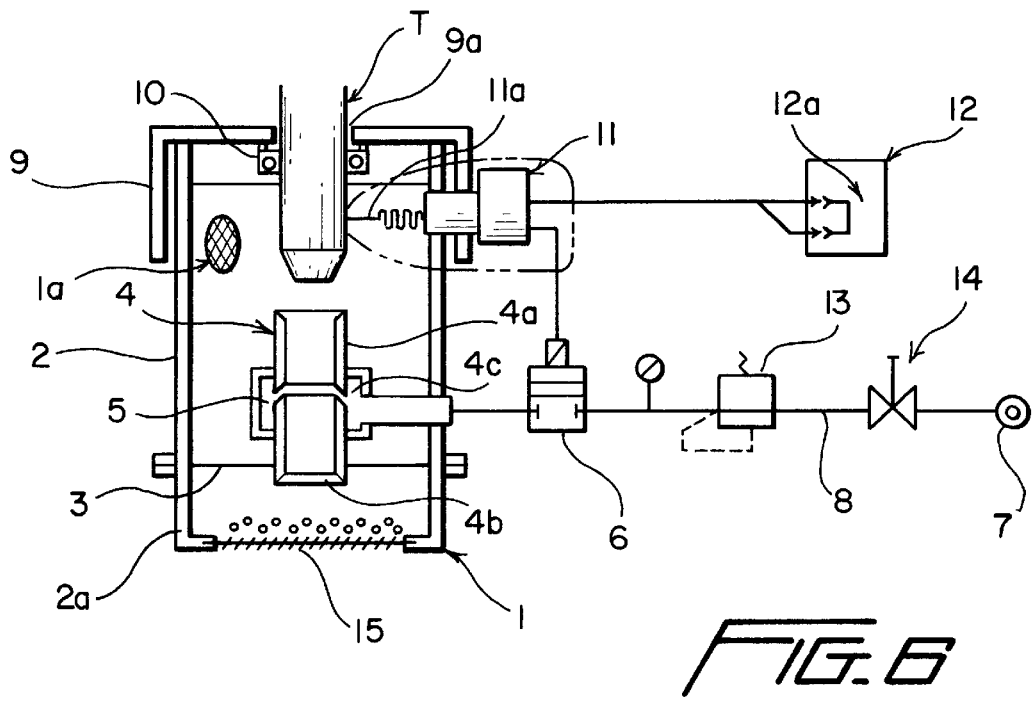
FIG. 6 is a schematic view which shows a conventional welding torch nozzle together with a control apparatus thereof.

Before inserting the torch nozzle T into the torch nozzle insertion hole 29a, so that the sensing mechanism 32 is operated so as to open the second solenoid valve 40, for example, the following operations may be performed by the control apparatus for the robot or the like. As shown by ① in FIG. 5, the first solenoid valve 49 is opened, and the compressed air is directed to the torch nozzle T through the previously opened valve 47 with the cock and the relief valve 48 by means of the soft tube 50 and the three way joint 51. Next, as shown by ② in FIG. 5, the fork-like nozzle sensing portion 32a of the sensing mechanism 32 is pressed by the torch nozzle T in the manner mentioned above so as to turn the switch main body 32b to an ON state, thereby opening the second solenoid valve 40, and the compressed air is supplied to the air introduction chamber 35 of the air nozzle mechanism 33 through the previously opened valve 44 with the cock and the relief valve 42 by means of the soft tube 41, the rigid tube 39 and the connecting tube 34.

Further, when the cleaning of the torch nozzle T is completed and the cleaning apparatus of the present invention is stopped, the operations may be performed in the following manner. As shown by ③ in FIG. 5, the torch nozzle T is drawn from the torch nozzle insertion hole 29a of the cylindrical container 21 in accordance with the present invention so as to close the second solenoid valve 40, and the control apparatus for the robot or the like, slightly delayed therefrom, closes the first solenoid valve 49 in ④.

When the operation is made in the above manner, during the cleaning operation, there the fine powders in the sputter do not enter into the torch nozzle so as to plug the welding wire.

What is claimed is:

1. A cleaning apparatus for a welding torch nozzle comprising:

a cylindrical container;

a screen member removably disposed at a lower end of said container and having a funnel-shaped member in an inner periphery thereof;

an air nozzle mechanism having an injection nozzle disposed above said screen member within said container;

a suction tube disposed under said nozzle;

an upwardly inclined injection port between said nozzle and said tube;

an air introduction chamber surrounding said injection port and connected to an air pressure introduction tube;

a cover plate disposed around an open upper end of said container so as to protect and mount an attachment apparatus and having an air guide extending over an air discharge port provided near said upper end;

a removable filter inserted from the upper end of said container and covering said air discharge port from inside the container;

a top plate covering the open upper end of said container, having a torch nozzle insertion hole in the center thereof coaxial with said injection nozzle and a recess portion for receiving a seal mechanism in correspondence to the torch nozzle in an inner periphery thereof;

a seal mechanism disposed in said recess portion;

a nozzle sensor having a front end formed in a fork shape;

a switch main body supporting said sensor and operated thereby, said main body extending through said container whereby said sensing portion front end comprises a torch nozzle sensing mechanism fixed in such a manner as to be positioned immediately below said torch nozzle insertion hole; and a small rigid ball supported on said screen member.

2. A cleaning apparatus for a welding torch nozzle as recited in claim 1, wherein said seal mechanism incorporates an expandable seal ring.

3. A cleaning apparatus for a welding torch nozzle as recited in claim 2, wherein said torch nozzle is provided with a shield gas passage, the apparatus further including:

a compressed air introduction tube having a compressed air source connected to said passage through a first solenoid valve;

a second solenoid valve interposed in said compressed air introduction tube, said torch nozzle sensing mechanism being electrically connected to said second solenoid valve; and said first solenoid valve, said second solenoid valve, and said torch nozzle sensing mechanism being connected to an electrical control apparatus.

4. A cleaning apparatus for a welding torch nozzle as recited in claim 1, wherein said torch nozzle is provided with a shield gas passage, the apparatus further including:

a compressed air introduction tube having a compressed air source connected to said passage through a first solenoid valve;

a second solenoid valve interposed in said air pressure introduction tube, said torch nozzle sensing mechanism being electrically connected to said second solenoid valve; and the first solenoid valve, the second solenoid valve and the torch nozzle sensing mechanism being connected to an electrical control apparatus.

5. A method of cleaning a welding torch nozzle comprising:

a step of connecting a compressed air introduction tube having a compressed air source to a shield gas passage communicating with the torch nozzle through a first solenoid valve;

a step of connecting a compressed air introduction tube having a compressed air source to an air nozzle mechanism having an injection nozzle disposed above a screen member within a container, a suction tube disposed under the nozzle, an inclined injection port connected to said air introduction tube through a second solenoid valve for directing air in an upwardly inclined direction between the nozzle and the tube;

a step of electrically-connecting a torch nozzle sensing mechanism to said second solenoid valve; and a step of connecting said first solenoid valve, said second solenoid valve and said torch nozzle sensing mechanism to an electrical control apparatus, wherein at a time of starting a cleaning operation of the welding torch nozzle, at first said first solenoid valve is opened, and next said second solenoid valve is opened, and at a time of finishing the cleaning operation, at first said second solenoid valve is closed and thereafter said first solenoid valve is closed.

* * * * *